US008868451B2

(12) United States Patent
Greaves et al.

(10) Patent No.: US 8,868,451 B2
(45) Date of Patent: Oct. 21, 2014

(54) TECHNOLOGY PLATFORM FOR ELECTRONIC COMMERCE AND A METHOD THEREOF

(76) Inventors: David Greaves, Carshalton Beeches (GB); Thomas Creaven, London (GB)

(*) Notice: Subject to any disclaimer, the term of this patent is extended or adjusted under 35 U.S.C. 154(b) by 2118 days.

(21) Appl. No.: 11/646,921

(22) Filed: Dec. 28, 2006

(65) Prior Publication Data
US 2007/0106938 A1    May 10, 2007

Related U.S. Application Data

(63) Continuation-in-part of application No. 10/867,909, filed on Jun. 15, 2004, now Pat. No. 7,606,740.

(51) Int. Cl.
*G06Q 30/00* (2012.01)
*G06Q 30/02* (2012.01)
(52) U.S. Cl.
CPC ..................................... *G06Q 30/02* (2013.01)
USPC .................... 705/26.61; 705/26.41; 705/7.29; 705/26.44
(58) Field of Classification Search
USPC ....................................................... 705/26, 27
See application file for complete search history.

(56) References Cited

U.S. PATENT DOCUMENTS

| 5,948,061 A | 9/1999 | Merriman et al. ............ 709/219 |
| 6,067,622 A * | 5/2000 | Moore ............................. 726/31 |
| 6,363,356 B1 | 3/2002 | Horstmann ..................... 705/26 |
| 6,477,509 B1 | 11/2002 | Hammons et al. ............. 705/27 |
| 6,629,135 B1 * | 9/2003 | Ross et al. ...................... 709/218 |
| 7,155,490 B1 | 12/2006 | Malmer et al. ................ 709/217 |
| 2001/0037205 A1 * | 11/2001 | Joao ................................. 705/1 |
| 2005/0246627 A1 * | 11/2005 | Sayed ............................. 715/513 |

OTHER PUBLICATIONS

Amazon's Web Services: Karpinski, Richard; "Amazon Releases Web Services API to E-Commerce Site," InternetWeek, Jul. 17, 2002; Proquest #138677551, 2pgs.*

* cited by examiner

*Primary Examiner* — Rob Pond
(74) *Attorney, Agent, or Firm* — Adams & Wilks

(57) ABSTRACT

A method and technology platform for electronic commerce use a software package including an interactive website. An Affiliate may access participating vendors and third-party sources to acquire information of interest, including product data, content, and website design templates.

20 Claims, 4 Drawing Sheets

TECHNOLOGY PLATFORM FOR ELECTRONIC COMMERCE AND A METHOD THEREOF

CROSS-REFERENCE TO RELATED APPLICATIONS

This application is a continuation-in-part of U.S. patent application Ser. No. 10/867,909 filed Jun. 15, 2004 now U.S. Pat. No. 7,606,740, which is herein incorporated by reference in its entirety.

BACKGROUND

I. Field

The present invention generally relates to electronic commerce and, more particularly, to technology platforms and methods for developing websites of vendor affiliates selling online vendor products to general public.

II. Background

Over the past several years, electronic commerce over the Internet experiences rapid growth and online shopping has become a routine method used by consumers for purchasing products, such as goods or services. One method of online shopping uses a "stocking Vendor/non-stocking Affiliate" scheme. This scheme allows to a non-stocking Affiliate of a participating Vendor to establish a "virtual" mail-order shop for selling vendor products over the Internet.

To operate the online mail-order shop, the Affiliate needs to create, maintain, and periodically update an Affiliate Website that contains information pertaining to vendor products and facilitates execution of online sales. One method for developing the Affiliate Website is disclosed in the referred to above U.S. patent application Ser. No. 10/867,909.

However, despite the considerable effort in the art devoted to development of methods for online shopping, further improvements in technology platforms and methods of electronic commerce would be desirable.

SUMMARY OF THE INVENTION

One aspect of the invention provides a method of electronic commerce using an electronic commerce software package including an interactive Platform Website and computer programs facilitating design of an Affiliate Website adapted for acquiring information of interest (for example, product related data or content, and the like). The software package is stored on a Platform Server connected to a server of a network accessible by a computer of the Affiliate and enables acquiring of the information from the Vendor Website or online third-party sources.

Another aspect of the present invention is a technology platform for electronic commerce utilizing the inventive method.

Yet another aspect of the present invention is a method for developing a website of an Affiliate selling online vendor products using information acquired from the Vendor Website or online third-party sources.

The Summary is neither intended nor should it be construed as being representative of the full extent and scope of the present invention, which these and additional aspects will become more readily apparent from the detailed description, particularly when taken together with the appended drawings.

Figure 1:
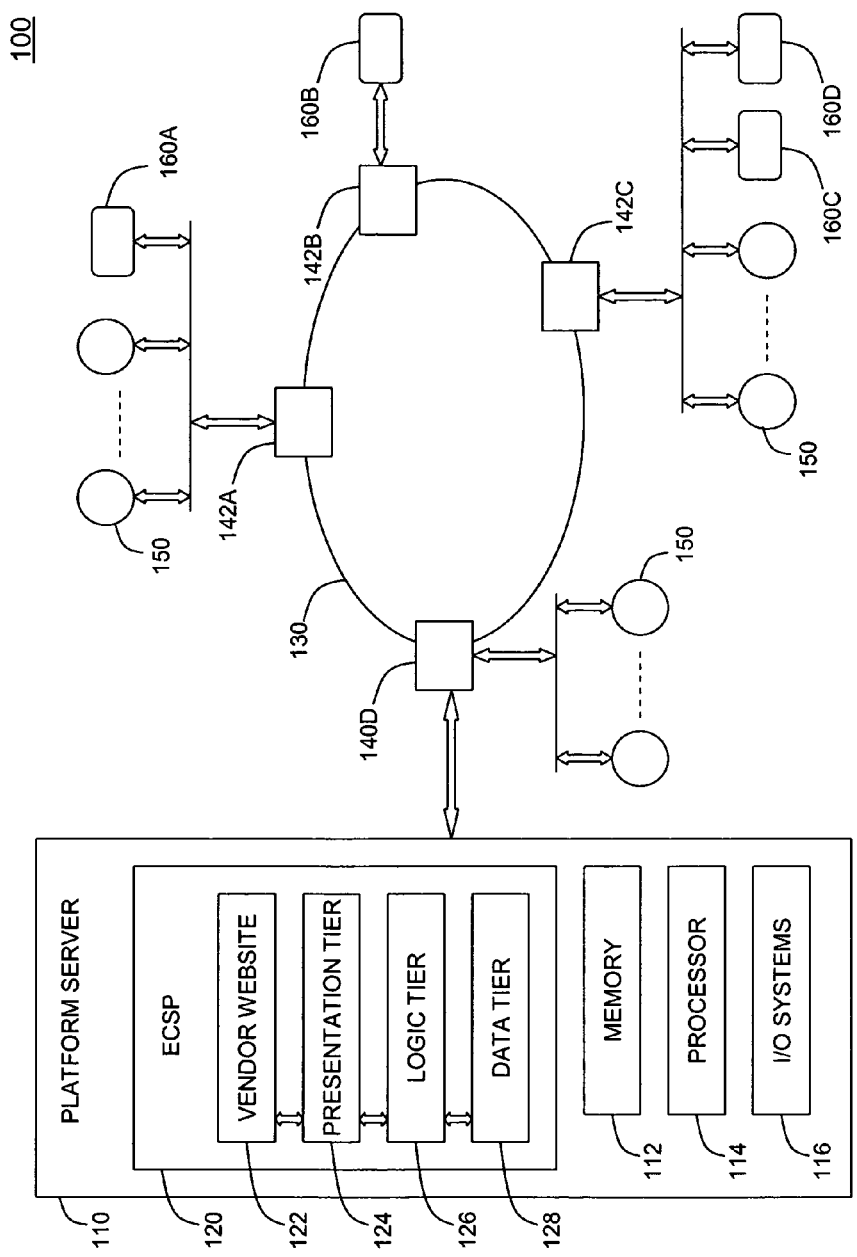
FIG. 1 is a high-level, schematic diagram of an exemplary computer system including a technology platform for electronic commerce in accordance with a preferred embodiment of the present invention.

To facilitate understanding, identical reference numerals have been used, where possible, to designate identical elements that are common to the figures, except that suffixes may be added, when appropriate, to differentiate such elements. The images in the drawings are conventionally simplified for illustrative purposes and are not depicted to scale.

The appended drawings illustrate exemplary embodiments of the invention and, as such, should not be considered as limiting the scope of the invention that may admit to other equally effective embodiments. It is contemplated that features or steps of one embodiment may be beneficially incorporated in other embodiments without further recitation.

DETAILED DESCRIPTION OF THE PREFERRED EMBODIMENT

Embodiments of the present invention are generally directed to a technology platform and method for electronic commerce, or e-commerce, which use an electronic commerce software package (ECSP) developed by the Inventors. The ECSP is based on graphical user interface (GUI) and allows to an Affiliate of a participating Vendor (e.g., Amazon.com, ART.com, and the like) to operate a virtual mail-order shop selling online, on a commission basis, products of the Vendor.

FIG. 1 is a high-level, schematic diagram of an exemplary computer system 100 including the inventive technology platform for electronic commerce. In one preferred embodiment of the present invention, the system 100 includes a Platform Server 110 and a network 130 (for example, the Internet) having a plurality of network servers 140 (network servers 140A-140D are shown). The network servers 140 are selectively connected to the Platform Server 110 (network server 140D) and interconnect computers 150 of Affiliates and computers of third-party online sources 160 (third-party sources 160A-160D are shown) of information of interest to the Affiliates. Together, the Platform Server 110 and the network 130 form the technology platform for electronic commerce of the present invention.

The Platform Server 110 generally includes a memory 112, a processor 114, and input/output (I/O) systems 116 and hosts an ECSP 120 of the present invention. The ECSP 120 may reside on the Platform Server 110 in a form of a transferable computer-readable medium (for example, data compact disk, flush memory drive, and the like) containing the ECSP 120 or be saved from such medium or downloaded from an external source (both not shown) in the memory 112. In operation, the ECSP 120 may be executed by the processor 114 from the computer-readable medium or, alternatively, the memory 112.

The ECSP 120 is based on GUI and organized in a multi-tier software stack. In particular, the ECSP 120 includes an interactive Platform Website 122 and computer programs that, together, enable design of an Affiliate Website adapted for acquiring information related to vendor products offered for sale by an Affiliate. Within the ECSP 120, these computer programs are configured as stand-alone software modules forming three functional tiers: (i) a Presentation Tier 124 operating as an intuitive interactive user interface, (ii) a Logic Tier 126 performing processing of user commands, and (iii) a Data Tier 128 facilitating storage and retrieval of an Affiliate-accessible portion of information available on the Platform Website 122.

The ECSP 120 provides users with a complete automated and intuitively operable system for developing or updating customized Affiliate Websites for facilitating commission-earning online sales of products of one or more participating Vendors. No programming skills are required from a user (i.e., the Affiliate) to utilize capabilities or features of the ECSP 120.

Figure 2:
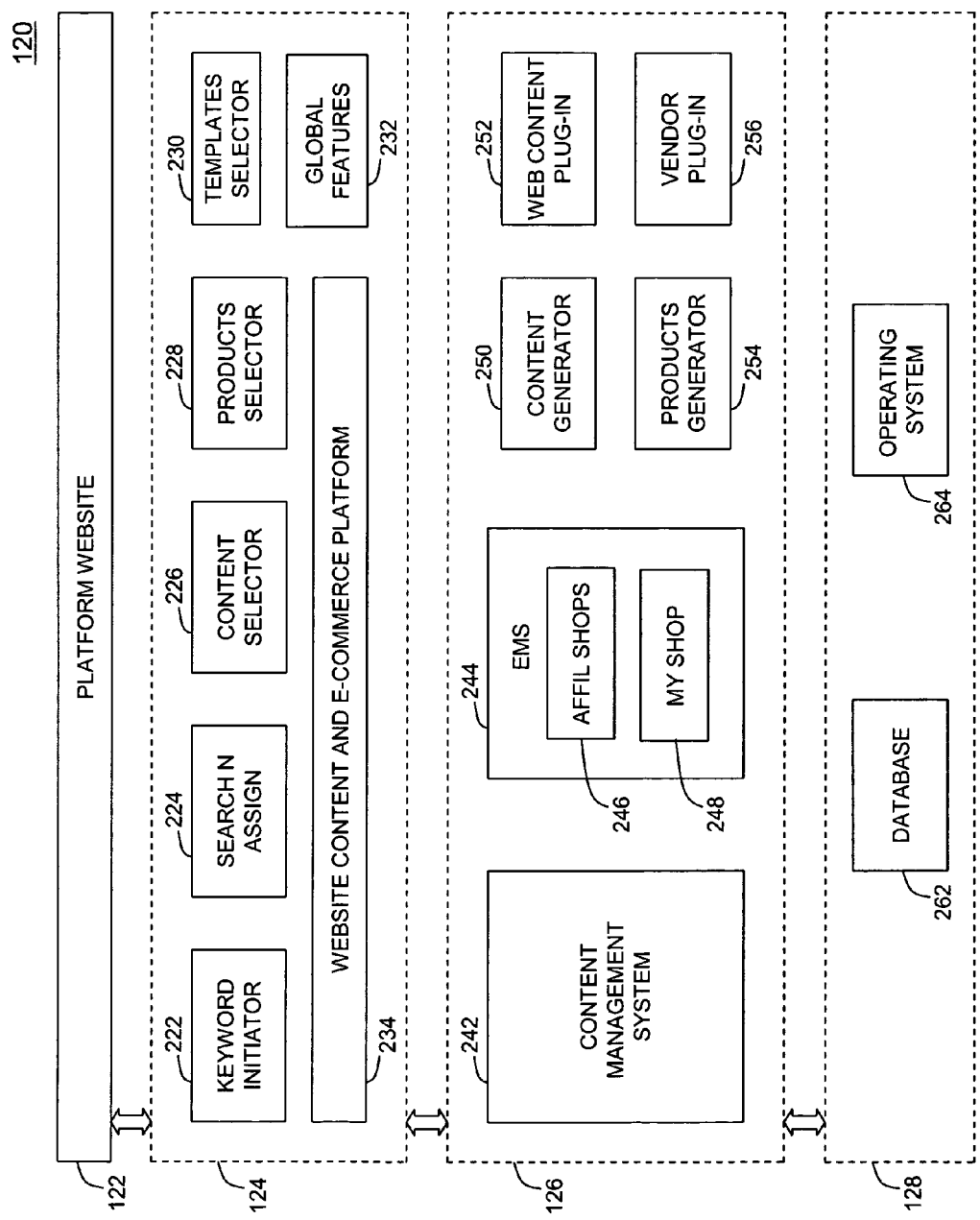
FIG. 2 is a high-level, schematic diagram of an exemplary software stack of the electronic commerce software package of the technology platform of FIG. 1.

FIG. 2 is a high-level, schematic diagram of an exemplary software stack of the ECSP 120. A user activates features of the ECSP 120 by accessing the interactive Platform Website 122, selecting (for example, from a drop-down menu) a participating Vendor, and logging on the Vendor Website from the Platform Website 122. Access to the Platform Website 122 or the Vendor Website may require execution of a user-identification routine and confirmation of user privileges and the scope thereof (for example, in a form of validating unique user identification codes obtained from Administrator of the Platform Website 122 or the respective participating Vendor).

In operation, the software modules of the ECSP 120 interactively communicate to and supplement one another and, together, form an integrated software platform. In alternate embodiments, the software stack of the ECSP 120 may be configured in a manner that at least some of the depicted herein modules or portions thereof form one or more specialized software modules.

Using GUI-based tools embedded in the Platform Website 122, the user can develop or update the Affiliate Website, as well as acquire information of interest from Vendor or the third-party sources 160. In particular, following step-by-step instructions, the user can locate, review, transfer to the user's computer, and edit thereon website template designs, product data, and content, among other information available on the Vendor Websites, from the third-party sources 160, or elsewhere on the network 130.

The Presentation Tier 124 includes the following software modules: Keyword Initiator 222, Search n Assign 224, Content Selector 226, Products Selector 228, Templates Selector (or Templates Grabber) 230, Global Features 232, and Website Content and e-Commerce Platform (WCEP) 234.

The Keyword Initiator 222 enables the user to conduct keyword-based online searches of the information of interest on the Vendor Website, as well as from the third-party sources 160. The Keyword Initiator 222 allows the user to enter keywords and form and save lists of the keywords. The Search n Assign 224 narrows such searches to data related to vendor products, while the Content Selector 226 narrows the searches to the content associated with the keywords. Accordingly, the Product Selector 228 narrows the searches to the data and content related to the vendor products that are currently sold by the Affiliate or selected for future sales. The Templates Selector 230, operating a template wizard, enables the user to choose, customize, and download website template designs from the Vendor Website or the third-party sources 160.

Using the Global Features 230, the user can automate a process of creating or updating the Affiliate Website. In broader terms, the Global Features 230 perform in an automatic manner the functions, which otherwise, using the modules 224, 226, 228, and 230, are available to the user in a manual or semi-manual mode. For example, the user can perform product data and content searches and selection, de-selection, validation, or updates of the information of interest for the entire list of pre-determined keywords instead of entering each of the keywords manually. The acquired information may automatically be processed for updating the current Affiliate Website, as well as for concurrently developing a new Affiliate Website employing a user-selected website template design.

The WCEP 234 is a software layer that, in operation, facilitates and supports user interactions with the ECSP 120. In particular, the WCEP 234 is responsible for enabling the Platform Website 122 and for receiving, recognizing, and routing of user commands within the ECSP 120.

The Logic Tier 126 includes Content Management System (or Content Grabber) 242, e-Commerce Management System (EMS) 244, Content Generator 250, Web Content Plug-in 252, Products Generator 254, and Vendor Plug-in 256 software modules. Both the Content Management System 242 and Products Generator 254 are adapted for acquiring data stored in multiple data formats.

The Content Management System 242 is used to select, retrieve, save, or edit the content of interest featured on the Vendor Website or available from the third-party sources 160.

The EMS 244 generally controls an electronic bookkeeping portion of the ECSP 120 and includes Affil Shops 246 and My Shop 246 modules. The Affil Shops module 246 enables the user to input the vendor products on the Affiliate Website. Accordingly, the My Shop module 248 enables the user to input on the Affiliate Website products other then the vendor products or products of other vendors. For products offered for sale on the Affiliate Website, the EMS 244 facilitates acceptance of different forms of payment, including credit card payments, charge card payments, and the like.

The Content Generator 250 allows the user to search and acquire online the content of interest from the third-party sources 160, and the Web Content Plug-in 252 is a tool used to acquire the content from a specific source (e.g., Wikepedia.org, online trade catalogs, and the like). Such operations may be commission-free content downloads, as well as commission-earning (i.e., for a fee) transactions.

The Products Generator 254 is a computer program disclosed in the referred to above U.S. patent application Ser. No. 10/867,909. The Products Generator 254 provides users with an automated solution for acquiring information relating to commission earning products from websites of the participating Vendors and creating or updating the Affiliate Website. The Vendor Plug-in 256 is a software tool that constrains capabilities of the Products Generator 254 to utilization of products and services offered by a specific vendor (e.g., Amazon.com).

In further embodiments, the Products Generator 254, within a single stand-alone software package, may incorporate functions and features of at least one of the Content Generator 250, Web Content Plug-in 252, Vendor Plug-in 256, and Templates Selector 230. Specifically, in this embodiment, the Products Generator 254 may perform (i) transferring to the computer of the Affiliate at least one of the vendor website template designs, vendor product data, or vendor content, (ii) transferring from the sources 160 to the computer of the Affiliate at least one of the third-party website template designs, third-party product information, or third-party content, and (iii) developing, updating, or editing the Affiliate Website utilizing the transferred data.

In further embodiments, the Logic Tier 126 may also include a plurality of specific features (i.e., software tools) intended to assist the Affiliate in development, maintenance, or enhancement of the Affiliate Website. In operation, such specific features increase application range, scalability, and ease of use of the ECSP 120 for creating Affiliate Websites having different levels of complexity. Examples of applicable software tools include an animation tool for providing enhanced presentation of the products, their functions, or product related content, and a time/date tool for time-stamping the product data, terms of sale, or the content (e.g., product availability, expiration dates, sale/rebate dates, and the like). Utilization of these and other corresponding software tools has been contemplated within the scope of the present invention.

The Data Tier 128 generally includes a Database 262 and an Operating System 264 supporting the ECSP 120. The Database 262 contains the computer programs of the ECSP 120 and information available via the Platform Website 122. In one embodiment, the Database 262 facilitates storage and retrieval of data using at least one of the Relational Database Management System based on Structured Query Language (MySQL), Open DataBase Connectivity (ODBC), Real Simple Syndication (RSS), Extensible Markup Language (XML), or Hypertext Markup Language (HTML) data formats, and the Operating System 264 is the Linux-based Kernel operating system.

Figure 3:
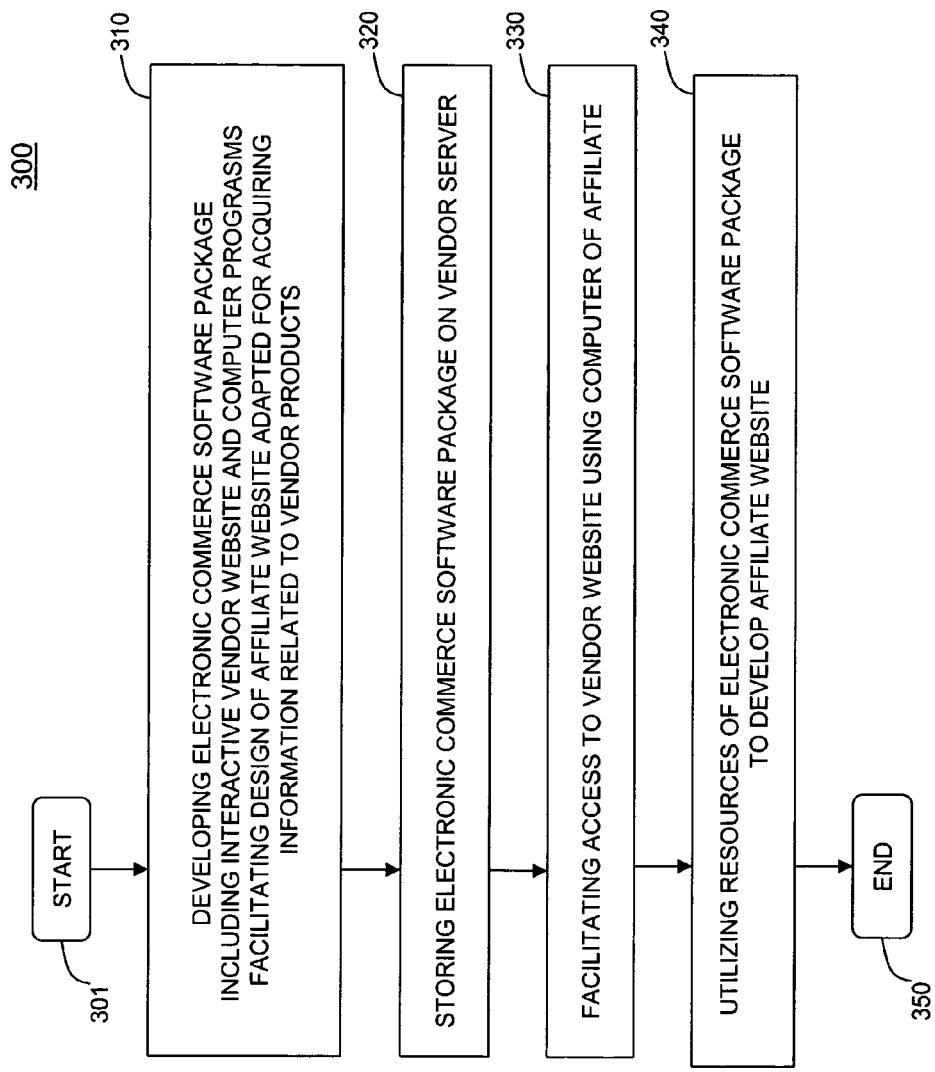
FIG. 3 is a flow diagram illustrating a method of electronic commerce using the technology platform of FIG. 1.

FIG. 3 is a flow diagram illustrating a method 300 of electronic commerce using the technology platform of FIG. 1 in one embodiment of the present invention.

In particular, FIG. 3 depicts a sequence of method steps performed to facilitate development of the Affiliate Website. In some embodiments, the method steps are performed in the depicted order. In alternate embodiments, at least two of these steps or portions thereof may be performed contemporaneously or in a different order. To best understand the invention, the reader should simultaneously refer to FIG. 3 and FIGS. 1-2.

The method 300 starts at step 301 and proceeds to step 310. At step 310, the ECSP 120 including an interactive Platform Website 122 and computer programs facilitating design of the Affiliate Website is developed. At step 320, the ECSP 120 is installed on the Platform Server 110 connected to the network server 140. At step 330, an Affiliate obtains access to the Platform Website 122, selects a Vendor from a list of the participating vendors, and obtains access to the Vendor Website, as well as to online resources available from the third-party sources 160. To log on the Vendor Website, the Affiliate may need to present a valid vendor-assigned software key.

Figure 4:
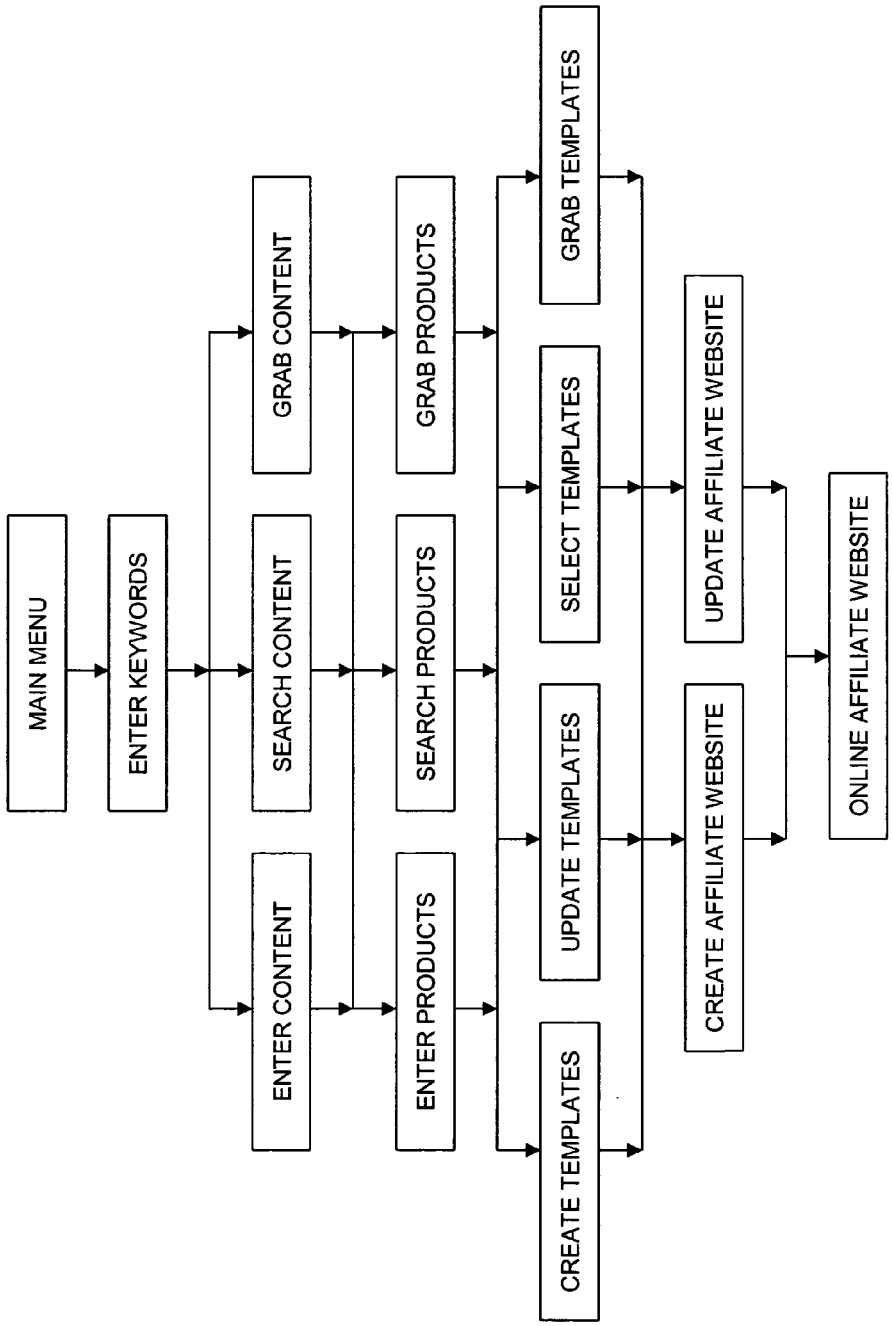
FIG. 4 is a schematic diagram illustrating an exemplary Main Manu of a Platform Website of the technology platform of FIG. 1.

At step 340, the Affiliate creates or updates the Affiliate Website using the tools accessible from the Platform Website 122. An exemplary Main Manu of the Platform Website 122 is depicted in FIG. 4. In particular, as discussed above in reference to FIG. 2, the Affiliate may use the respective software modules of the Presentation Tier 124 to enter specific commands or requests, which are then processed by the modules of the Logic Tier 126.

When the user inputs relate to the information provided on the Vendor Website, the corresponding data (e.g., product data, content, or website template design) may in real time be acquired from the Vendor Website and downloaded to the computer of the Affiliate, otherwise the information of interest may similarly be obtained from the third-party sources 160 or, contemporaneously, from both the Vendor Website and sources 160.

In particular, after accessing via the Platform Website 122 resources of the Vendor Website, online third-party sources 160 or both, the Affiliate may utilize, among other discussed above capabilities of the ECSP 120, one or more of the following features: entering keywords, forming lists of keywords, retrieving product data or a content relating to the keywords, acquiring at least a portion of the product data and the content, acquiring website design templates for the Affiliate Website, and automating a process of developing, editing, or updating the Affiliate Website. At step 350, upon completion of step 340, the method 300 ends.

In exemplary embodiments, the method 300 may be implemented in hardware, software, firmware, or any combination thereof in a form of a computer program product comprising one or more computer-executable instructions. When implemented in software, the computer program product may be stored on or transmitted using a computer-readable medium, which includes computer storage medium and computer communication medium.

The term "computer storage medium" refers herein to any medium adapted for storing the instructions that cause the computer to execute the method. By way of example, and not limitation, the computer storage medium may comprise solid-sate memory devices, including electronic memory devices (e.g., RAM, ROM, EEPROM, and the like), optical memory devices (e.g., compact discs (CD), digital versatile discs (DVD), and the like), or magnetic memory devices (e.g., hard drives, flash drives, tape drives, and the like), or other memory devices adapted to store the computer program product, or a combination of such memory devices.

The term "computer communication medium" refers herein to any physical interface adapted to transmit the computer program product from one place to another using for example, a modulated carrier wave, an optical signal, a DC or AC current, and the like means. By way of example, and not limitation, the computer communication medium may comprise twisted wire pairs, printed or flat cables, coaxial cables, fiber-optic cables, digital subscriber lines (DSL), or other wired, wireless, or optical serial or parallel interfaces, or a combination thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. In an electronic commerce software package platform, a method of creating an affiliate website, comprising:
    identifying at least one keyword to be used to perform a first and a second keyword-based online search of information of interest on a vendor website and of at least one online third party source, respectively;
    conducting the first keyword-based search to generate product codes to commission earning items associated with the at least one keyword;
    reducing, using a products generator, the set of product codes to a portion of the generated product codes;
    conducting the second keyword-based search to generate content associated with the at least one keyword;
    reducing, using a content generator, the generated content to produce content that is a portion of the generated content;
    identifying a website template; and
    creating the affiliate website using the portion of the generated product codes, the portion of the generated content and the identified website template.

2. The method of claim 1, further comprising embedding graphical-user interface (GUI)-based tools in the affiliate website to enable updating the affiliate website by the owner of the website.

3. The method of claim 2, wherein the GUI-based tools include a keyword initiator to receive and store keywords.

4. The method of claim 2, wherein the GUI-based tools include a keyword initiator to retrieve stored keywords.

5. The method of claim 2, wherein the GUI-based tools include a templates selector operating a templates wizard to perform at least one of choosing, customizing, and downloading website template designs.

6. The method of claim 2, wherein the GUI-based tools include a global features module to automatically update the affiliate website without user intervention.

7. The method of claim 2, wherein the GUI-based tools include a global features module to automatically create the affiliate website without user intervention.

8. The method of claim 7, wherein the GUI-based tools include a module to enable the owner to retrieve product codes from a plurality of vendor websites, the method further comprising (i) automatically identifying a tracking id assigned by each vendor and (ii) automatically inserting the identified tracking id into the HTML code of each product code to ensure a commission is earned from the corresponding vendor when a visitor to the affiliate website clicks on a link associated with a chosen product code.

9. A non-transitory computer program product including instructions which when loaded to a computing device help to create an affiliate website, the computer program product including instructions to:
    identify at least one keyword to be used to perform a first and a second keyword-based online search of information of interest on a vendor website and of at least one online third party source, respectively;
    conduct the first keyword-based search to generate product codes to commission earning items associated with the at least one keyword;
    reduce, using a products generator, the set of product codes to a portion of the generated product codes;
    conduct the second keyword-based search to generate content associated with the at least one keyword;
    reduce, using a content generator, the generated content to produce content that is a portion of the generated content;
    identify a website template; and
    create the affiliate website using the portion of the generated product codes, the portion of the generated content and the identified website template.

10. The non-transitory computer program product of claim 9, further comprising instructions to embed graphical-user interface GUI-based tools in the affiliate website that enable updating the affiliate website by the owner of the website.

11. The non-transitory computer program product of claim 10, wherein the GUI-based tools include a keyword initiator to receive and store keywords.

12. The non-transitory computer program product of claim 10, wherein the GUI-based tools include a keyword initiator to retrieve stored keywords.

13. The non-transitory computer program product of claim 10, wherein the GUI-based tools include a templates selector operating a templates wizard to perform at least one of choosing, customizing, and downloading website template designs.

14. The non-transitory computer program product of claim 10, wherein the GUI-based tools include a global features module to automatically update the affiliate website without user intervention.

15. The non-transitory computer program product of claim 10, wherein the GUI-based tools include a global features module to automatically create the affiliate website without user intervention.

16. The non-transitory computer program product of claim 15, wherein the GUI-based tools include a module to enable the owner to retrieve product codes from a plurality of vendor websites, the computer program product further comprising instructions to (i) automatically identify a tracking id assigned by each vendor and (ii) automatically insert the identified tracking id into the HTML code of each product code to ensure a commission is earned from the corresponding vendor when a visitor to the affiliate website clicks on a link associated with a chosen product code.

17. A platform server including an electronic commerce software package for creating an affiliate website, comprising:
    means for identifying at least one keyword to be used to perform a first and a second keyword-based online search of information of interest on a vendor website and of at least one online third party source, respectively;
    a product generator to conduct the first keyword-based search to generate product codes to commission earning items associated with the at least one keyword and to reduce the set of product codes to a portion of the generated product codes;
    a content generator to conduct the second keyword-based search to generate content associated with the at least one keyword and to reduce the generated content to produce content that is a portion of the generated content;
    means for identifying a website template; and
    means for creating the affiliate website using the portion of the generated product codes, the portion of the generated content and the identified website template.

18. The platform server of claim 17, further comprising means for embedding GUI-based tools in the affiliate website to enable updating the affiliate website by the owner of the website, where the GUI includes:
    a keyword initiator to receive and store keywords;
    a templates selector operating a templates wizard to perform at least one of choosing, customizing, and downloading website template designs; and
    a global features module to automatically update the affiliate website without user intervention.

19. The platform server of claim 18, wherein the GUI-based tools include a module to enable the owner to retrieve product codes from a plurality of vendor websites, the products generator further comprising (i) means for automatically identifying a tracking id assigned by each vendor and (ii) means for automatically inserting the identified tracking id into the HTML code of each product code to ensure a commission is earned from the corresponding vendor when a visitor to the affiliate website clicks on a link associated with a chosen product code.

20. The platform server of claim 17, wherein the product generator searches for product codes from among a plurality of vendor websites, the products generator further comprising (i) means for automatically identifying the associated tracking id assigned by each vendor and (ii) means for automatically inserting the identified tracking id into the HTML code of each product code to ensure a commission is earned from the corresponding vendor when a visitor to the affiliate website clicks on a link associated with a chosen product code.

* * * * *